(12) United States Patent
Chandnani

(10) Patent No.: US 8,453,242 B2
(45) Date of Patent: May 28, 2013

(54) SYSTEM AND METHOD FOR SCANNING HANDLES

(75) Inventor: Anjali Chandnani, Moonee Ponds (AU)

(73) Assignee: CA, Inc., Islandia, NY (US)

( * ) Notice: Subject to any disclaimer, the term of this patent is extended or adjusted under 35 U.S.C. 154(b) by 1631 days.

(21) Appl. No.: 11/202,446

(22) Filed: Aug. 12, 2005

(65) Prior Publication Data

US 2007/0039052 A1  Feb. 15, 2007

(51) Int. Cl.
*G06F 12/16* (2006.01)

(52) U.S. Cl.
USPC .......................................... 726/24; 713/188

(58) Field of Classification Search
USPC ....................... 726/22–24; 713/188
See application file for complete search history.

(56) References Cited

U.S. PATENT DOCUMENTS

| | | | |
|---|---|---|---|
| 6,928,555 B1 | 8/2005 | Drew | 713/201 |
| 7,020,798 B2 * | 3/2006 | Meng et al. | 714/6.31 |
| 7,260,847 B2 * | 8/2007 | Sobel et al. | 726/24 |
| 7,363,657 B2 * | 4/2008 | Caccavale | 726/24 |
| 7,549,164 B2 * | 6/2009 | Cook et al. | 726/22 |
| 7,681,237 B1 * | 3/2010 | Spiegel et al. | 726/24 |
| 2003/0110391 A1 | 6/2003 | Wolff et al. | 713/200 |
| 2005/0097143 A1 | 5/2005 | Pudipeddi et al. | 707/200 |
| 2005/0114338 A1 | 5/2005 | Borthakur et al. | 707/9 |
| 2005/0273858 A1 * | 12/2005 | Zadok et al. | 726/24 |
| 2006/0218637 A1 * | 9/2006 | Thomas et al. | 726/23 |

OTHER PUBLICATIONS

*Notification of Transmittal of the International Search Report and the Written Opinion* for International Application No. PCT/US2006/030444 filed on Aug. 3, 2006 (10 Pgs), Dec. 7, 2006.

* cited by examiner

*Primary Examiner* — Amare F Tabor
(74) *Attorney, Agent, or Firm* — Baker Botts L.L.P.

(57) ABSTRACT

According to an embodiment of the invention a method of detecting malware in a system comprises positioning a filter driver between an operating system for the system and applications or files in the system. The filter driver receives requests for resources from the applications or files and relays the requests to the operating system. The filter driver receives responses to the requests, which include handles; records information associated with the handles in a handle list; and relays the responses to the applications or files, which open the handles. Potential malicious code is detected by analyzing information associated with the open handles. In particular embodiments, analyzing information associated with the open handles may comprise analyzing system resources referenced by the open handles.

16 Claims, 2 Drawing Sheets

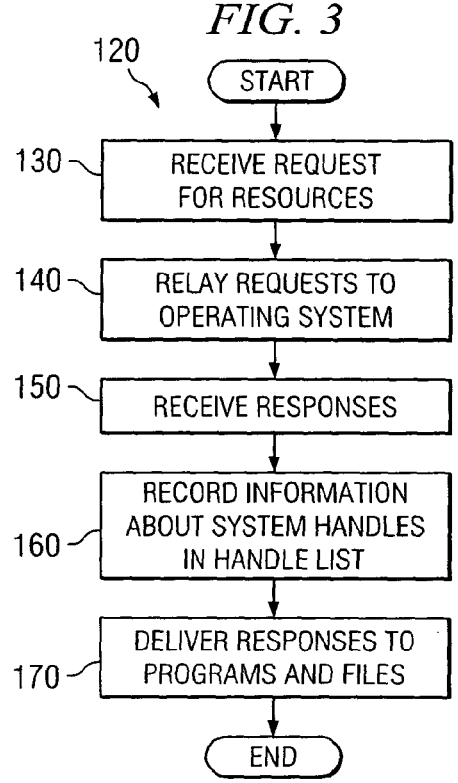
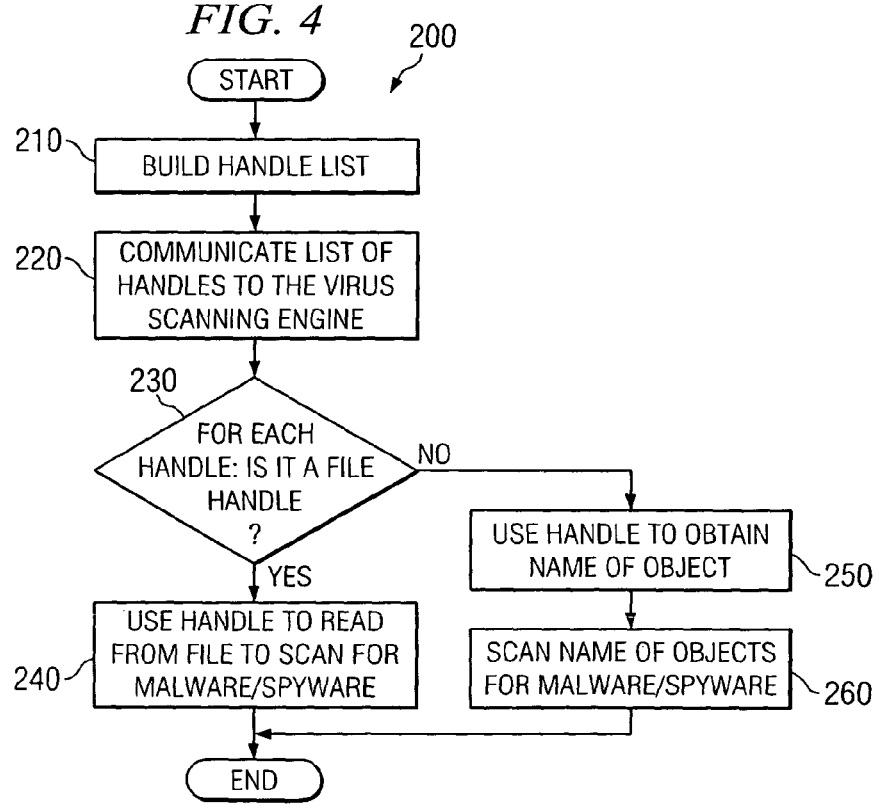

SYSTEM AND METHOD FOR SCANNING HANDLES

TECHNICAL FIELD OF THE INVENTION

This invention relates generally to the field of computers and, more particularly, to a system and method for scanning handles.

BACKGROUND OF THE INVENTION

Malware may generally refer to any form of malicious software, which can undesirably exist in a computer system. Categories of malware include, but are not limited to, viruses, worms, trojan horses, backdoors, and spyware. Viruses and worms may generally refer to software designed with a purpose of, among other things, replicating itself. Viruses typically utilize a host to spread whereas worms are typically stand-alone software. Trojan horses may generally refer to software that is disguised as legitimate software, but contains additional hidden code which, among other malicious activities, may allow the unauthorized collection, exploitation, falsification, or destruction of data. Backdoors may generally refer to software that allows access to computer systems bypassing normal authentication procedures. Spyware may generally refer to software that collects and sends information (such as browsing patterns in the more benign cases or credit card numbers in more malicious cases) about users, typically without explicit notification.

Virus scanning programs are utilized to detect and eliminate malware. To facilitate detection, virus scanning programs utilize malware definitions to scan a computer system. The malware definitions generally describe characteristics associated with a particular coding of malware. As new malware is developed, new malware definitions are determined.

In any particular computer system, there is a constant race between the arrival of the malware and the arrival of malware's corresponding definition. If the malware code arrives before the malware definitions, the malware may be capable of stealthing or hiding its existence from the virus scanning program—even after the definitions arrive.

SUMMARY OF THE INVENTION

According to an embodiment of the invention a method of detecting malware in a system comprises positioning a filter driver between an operating system for the system and applications or files in the system. The filter driver receives requests for resources from the applications or files and relays the requests to the operating system. The filter driver receives responses to the requests, which include handles; records information associated with the handles in a handle list; and relays the responses to the applications or files, which open the handles. Potential malicious code is detected by analyzing information associated with the open handles. In particular embodiments, analyzing information associated with the open handles may comprise analyzing system resources referenced by the open handles.

Certain embodiments of the invention may provide numerous technical advantages. For example, a technical advantage of one embodiment may include the capability to scan for malware by analyzing resources referenced by system handles. Another technical advantage of another embodiment may include the capability to create a list of system handles using a filter driver.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of example embodiments of the present invention and its advantages, reference is now made to the following description, taken in conjunction with the accompanying drawings, in which:

FIG. 3 shows a flow diagram of a processing by a filter driver, according to an embodiment of the invention; and FIG. 4 shows a flow diagram for a scanning process, according to an embodiment of the invention.

DETAILED DESCRIPTION OF EXAMPLE EMBODIMENTS OF THE INVENTION

It should be understood at the outset that although example embodiments of the present invention are illustrated below, the present invention may be implemented using any number of techniques, whether currently known or in existence. The present invention should in no way be limited to the example embodiments, drawings, and techniques illustrated below, including the embodiments and implementation illustrated and described herein. Additionally, the drawings are not necessarily drawn to scale.

Virus scanning programs are utilized to detect and eliminate malware. To facilitate detection, virus scanning programs utilize malware definitions to scan a computer system. The malware definitions generally describe characteristics associated with a particular coding of malware. As new malware is developed, new malware definitions are determined.

In any particular computer system, there is a constant race between the arrival of the malware and the arrival of the malware's corresponding definitions. If the malware code arrives before the malware definitions, the malware may be capable of stealthing or hiding its existence from the virus scanning program—even after the definitions arrive. For example, in Win32 systems malware can stealth or hide itself from detection by FindFirst/FindNext system functions, which are generally utilized in a system to search for a matching file in a specified directory. Accordingly, to detect such malware, virus scanning programs were modified to search files of active process in the system, for example, using ProcessFirst/ProcessNext system functions. However, malware code began to stealth or hide itself from detection by ProcessFirst/ProcessNext system functions, preventing such virus scanning programs from finding the processes of the malware. Additionally, the malware code began to stealth itself from detection by CreateFile functions (which generally create an object or file), preventing virus scanning programs from scanning files associated with malware. Accordingly, teachings of embodiments of the invention recognize that malware can be detected by scanning open handles in the system used by the malware. Additionally, teachings of other embodiments of the invention recognize that a list of open handles in the system can be made using a filter driver.

Figure 1:
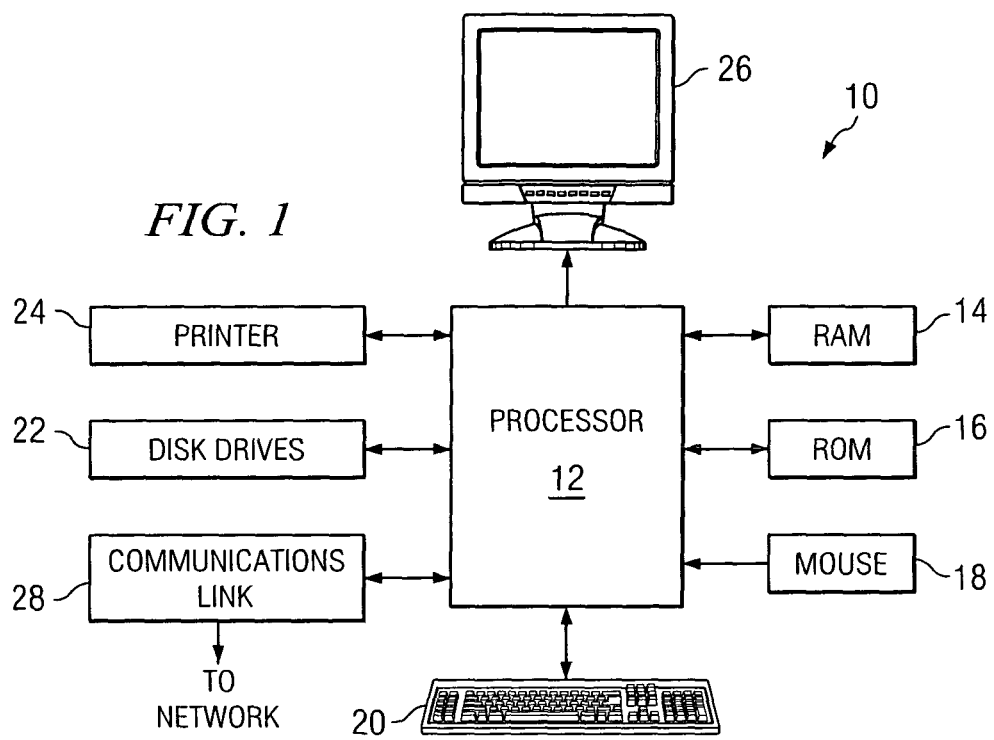
FIG. 1 shows an embodiment of a general purpose computer that may be used in connection with one or more pieces of software employed by other embodiments of the invention.

FIG. 1 shows an embodiment of a general purpose computer 10 that may be used in connection with one or more pieces of software employed by other embodiments of the invention. General purpose computer 10 may be adapted to execute any of the well-known OS2, UNIX, Mac-OS, Linux, and Windows Operating Systems or other operating systems. The general purpose computer 10 in the embodiment of FIG. 1 comprises a processor 12, a random access memory (RAM) 14, a read only memory (ROM) 16, a mouse 18, a keyboard 20 and input/output devices such as a printer 24, disk drives 22, a display 26 and a communications link 28. In other embodiments, the general purpose computer 10 may include more, fewer, or other component parts.

Embodiments of the present invention may include programs that may be stored in the RAM 14, the ROM 16, disk drives 22, or other suitable memory and may be executed by the processor 12. The communications link 28 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; radio communications; a satellite network; an enterprise intranet; other suitable communication links; or any combination of the preceding. Disk drives 22 may include a variety of types of storage media such as, for example, floppy disk drives, hard disk drives, CD ROM drives, DVD ROM drives, magnetic tape drives or other suitable storage media. Although this embodiment employs a plurality of disk drives 22, a single disk drive 22 may be used without departing from the scope of the invention.

Although FIG. 1 provides one embodiment of a computer that may be used with other embodiments of the invention, other embodiments of a computer may additionally utilize computers other than general purpose computers as well as general purpose computers without conventional operating systems. Additionally, embodiments of the invention may also employ multiple general purpose computers 10 or other computers networked together in a computer network. Most commonly, multiple general purpose computers 10 or other computers may be networked through the Internet and/or in a client server network. Embodiments of the invention may also be used with a combination of separate computer networks each linked together by a private or a public network.

Several embodiments of the invention may include logic contained within a computer-readable medium. In the embodiment of FIG. 1, the logic comprises computer software executable on the general purpose computer 10. The medium may include the RAM 14, the ROM 16 or the disk drives 22. In other embodiments, the logic may be contained within hardware configuration or a combination of software and hardware configurations. The logic may also be embedded within any other suitable medium without departing from the scope of the invention.

Figure 2:
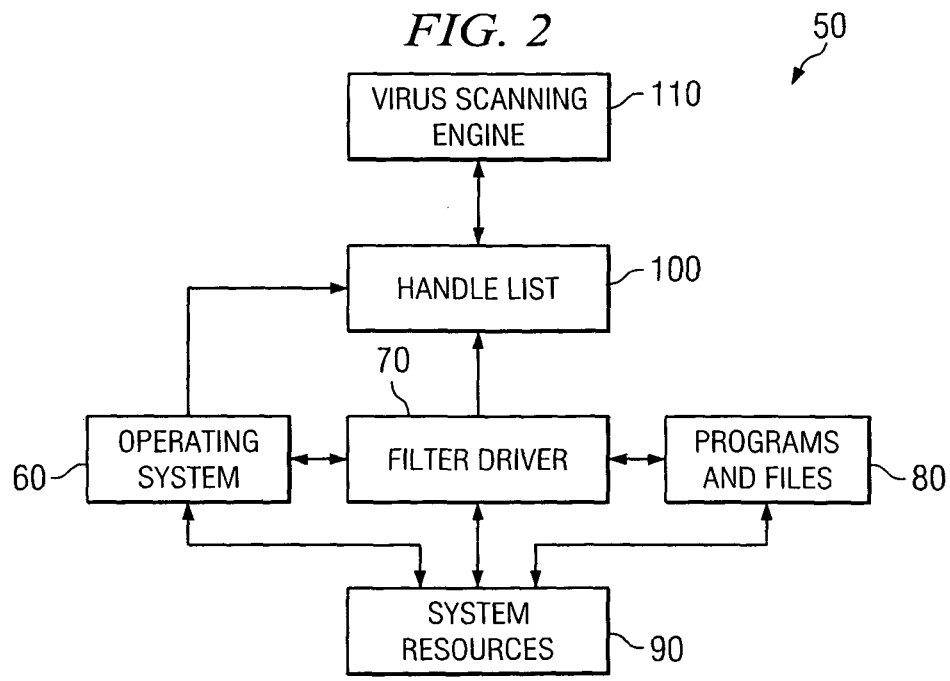
FIG. 2 shows a system for scanning system handles, according to an embodiment of the invention.

FIG. 2 shows components of a system 50 for scanning system handles, according to an embodiment of the invention. The system 50 may implemented in any of a variety of systems that process data, including, but not limited to, the general purpose computer 10 described in FIG. 1. The system 50 in this embodiment includes an operating system 60, a filter driver 70, programs and files 80, system resources 90, a handle list 100, and a virus scanning engine 110. Each of these components of system 50 may be stored in RAM RAM 14, the ROM 16 or the disk drives 22 in one example embodiment. The operating system 60 may be any of variety of operating systems, including, but not limited to, DOS, OS2, UNIX, Mac-OS, Linux, and Windows. Although not explicitly shown, the operating system 60 may include any of a variety of components typically utilized in operating systems 60 to help manage systems 50. For example, operating system 60 may include a kernel that manages system resources 90 and an application program interface (API).

The system resources 90 may include any of variety resources on the system 50, including, but not limited to memory and space on disk drives. The programs and files 80 may include a variety of logic (whether malevolent or benevolent) encoded in software, hardware, or a combination of software and hardware. A "handle" may generally refer to a number or token that provides programs and files 80 access to a system resource 90. For example, a handle has a value that may point to a particular system resource 90. When the programs and files block 80 uses the handle, the value of the handle tells the system 50 which resource, from a pool of system resources 90 maintained by the operating system 60, to use. Thus, in operation the programs and files 80 may request one or more of the system resources 90 from the operating system 60. In response to this request, the programs and files 80 may receive a system handle, which the programs and files 80 uses to access the system resource requested.

The filter driver 70 may intercept requests for systems resources 90 from the programs and files 80 and/or the response to the request for systems resources 90 issued by the operating system 60. In the embodiment of FIG. 2, the filter driver 70 is shown communicatively positioned between the operating system 60 and the programs and files 80. In some embodiments, the filter driver 70 may be integrated with portions of the operating system 60. In other embodiments, the filter driver 70 may be utilized separate from the operating system 60, serving as an intermediary between the operating system 60 and the programs and files 80. In the request of the system resources 90 by the programs and files 80, the filter driver 70 in some embodiments may be positioned in such a manner that the programs and files 80 believe they are communicating with the operating system 60. Further details of processing by the filter driver 70 are described with reference to FIG. 3.

The handle list 100 includes information associated with handles issued by the system 50 for system resources 90. The information in the handle list 100 may include, but is not limited to a handle type, a handle name, a handle value, an access mask, and an object address. This information may be utilized to scan for particular viruses. In particular embodiments, the handle list 100 may include open handles, which are handles that correspond to active programs and files 80. The handle list 100 may be populated in a variety of manners as will be described below with reference to FIG. 4.

According to teachings of the invention, the virus scanning engine 110 may use the handle list 100 to determine if any of the programs and files in programs and files block 80 are malevolent, and, if so, take appropriate corrective actions. Any of a variety of different virus scanning engines 110 may be utilized in this regard. Particular embodiments of the invention are not intended as being limited to any particular technology. Rather, some embodiments of the invention are intended to utilize the latest virus scanning techniques in the virus scanning engine 110. The virus scanning engine 110 may utilize virus scan definitions and receive virus scan definition updates, which facilitate detection of new viruses by the virus scanning engine 110. System handles are particularly useful for scanning for viruses because an malware has difficulty stealthing its use of the system resources. Further details of virus scanning are described below with reference to FIG. 4.

FIG. 3 shows a flow diagram of a process 120 performed by filter driver 70, according to an embodiment of the invention. In describing the process 120 of FIG. 3, reference is also made to FIG. 2. The process 120 may begin by the filter driver 70 receiving a request for system resources 90 from programs and files 80 at step 130. As described above, this receipt of a request may be one that is intercepted, for example, the programs and files 80 may direct the request towards the operating system 60. Upon receipt of the request, the filter driver 70 may relay the request for system resources 90 to the operating system at step 140. The operating system 60 may then construct a response, which includes a system handle, and relay the response to the filter driver 70, which may be received by the filter driver 70 at step 150. Upon receiving this response, the filter driver 70 may record information concerning the handle to the handle list 100 at step 160. As referenced above, the information in the handle list 100 may include in one embodiment, but is not limited to, a handle type, a handle name, a handle value, an access mask, and an object address. Then, the response with the system handle 170 may be delivered to the requesting program at step 170. The requesting program or file then may open the handle to access the system resources 90.

FIG. 4 shows a flow diagram for a scanning process 200, according to an embodiment of the invention. In describing the scanning process 400 of FIG. 4, reference is also made to FIG. 2. The programs and files 80 may utilize system resources 90 (e.g., upon making an appropriate request) and accordingly each may have a system handle associated therewith. Therefore, the scanning process 200 may commence at step 210 by building a handle list 100. As briefly referenced above, this may be accomplished in a variety of manners. For example, in one embodiment, the handle list 100 may be populated by information gathered by the filter driver 70.

In other embodiments, the system handle information may be provided directly from the operating system 60, for example using functions calls available in the operating system's application program interface (API). As an example, a list of handles may be obtained from Microsoft's native API for its NT operating system by issuing the command "ZwQuerySystemInformation" with a "SystemHandleInformation" request. Additionally, a name of the object may be obtained using the commands "ZwQuerySystemInformation" with a "SystemObjectInformation" request and the commands "ZwQueryObject" with an "ObjectNameInformation" request. Similar function calls may be utilized in other operating systems 60 to obtain handle information. In still yet other embodiments, the system handle information for the handle list 100 may be obtained from a combination of the operating system 60 and the filter driver 70. In such embodiments, the information from both sources may be checked for integrity. A deviation between the two may be an indication that malware is attempting to hide or stealth its detection. For example, in some embodiments, portions of the handle lists obtained from the two sources may be expected to be the same. If those portions of the lists are not the same, malware may have stealthed itself from being detected on one of the handle lists.

As referenced above, the handle list 100 may include in one embodiment information such as, but not limited to, a handle type, a handle name, a handle value, an access mask, and an object address. After building the handle list 100 at step 210, the handle list 100 may be communicated to the virus scanning engine 110. This communication may include passing the handle list 100 to the virus scanning engine 110 or the virus scanning engine 110 accessing the handle list 100. In particular embodiments, such communication may occur after an update of the virus definitions in the virus scanning engine 110.

Upon accessing the handle list 100 by the virus scanning engine 110, the virus scanning engine 110 at step 230 may determine for each handle whether or not it is a file handle. If so, the scanning process 200 for each handle may proceed to step 240. If not, the scanning process 200 for each handle may proceed to step 250. At step 240, the virus scanning engine 110 uses a handle to obtain the files associated with the handle so that the virus scanning engine 110 may scan the contents of the associated files for malware. In scanning the contents of the files, the virus scanning engine 110 may use virus definitions.

At step 250, the handle may be used to obtain the name of the object associated with the handle. In particular embodiments the handle name may already be populated in the list 100. In other embodiments, the handle name may be obtained after the scanning begins. Upon determination of the handle name, the handle names may be compared against virus definitions to determine whether the particular object name is capable of being created by malware.

If malware is found, the virus scan engine 110 may take the appropriate actions to attempt to remove the malware. In particular embodiments of the invention, the scanning of system handles may be done after a traditional scan has been accomplished. Thus, malware that "slips through the cracks", for example, because of stealthing techniques may be discovered upon a subsequent scan of the system handles. Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A method of detecting malware in a system, the method comprising:
    receiving, at a filter driver positioned between an operating system for the system and applications or files in the system, requests for resources from the applications or files;
    relaying the requests to the operating system;
    receiving, at the filter driver, responses to the requests, the responses including handles;
    recording, by the filter driver, information associated with the handles in a handle list, wherein the recorded information comprises handle names associated with the handles included in the responses;
    relaying, from the filter driver, the responses to the applications or files, the applications or files opening the handles;
    detecting potential malicious code associated with the malware by determining whether the handle names recorded in the handle list are capable of being created by code associated with malware;
    obtaining information associated with the open handles directly from the operating system of the system, wherein obtaining information comprises using function calls to an application program interface for the operating system of the system,
    wherein obtaining the information associated with the open handles directly from the operating system of the system further comprises:
        sending, by a virus scanning engine, a function call to the application program interface for the operating system; and receiving, by the virus scanning engine and in response to the function call, information associated with open handles in the system directly from the operating system; and comparing the recorded information from the filter driver and the obtained information directly from the operating system for deviations to detect malicious code potentially stealthed from inclusion in the recorded information or the obtained information.

2. The method of claim 1, further comprising determining if the open handles are file handles and scanning the contents of files associated with the open handles if the open handle are file handles.

3. A method of detecting malware in a system, the method comprising:

building a handle list comprising information associated with open handles in the system, wherein the information comprises handle names associated with the open handles in the system;

detecting potential malicious code associated with the malware by determining whether the handle names in the handle list are capable of being created by code associated with malware;

obtaining information associated with the open handles directly from an operating system of the system, wherein obtaining the information comprises using function calls to an application program interface for the operating system, wherein obtaining the information associated with the open handles directly from the operating system of the system further comprises:

sending, by a virus scanning engine, a function call to the application program interface for the operating system; and receiving, by the virus scanning engine and in response to the function call, information associated with open handles in the system directly from the operating system; and comparing information from the handle list and the obtained information directly from the operating system for deviations to detect malicious code potentially stealthed from inclusion in the handle list or the obtained information.

4. The method of claim 3, further comprising determining if the open handles are files handles and scanning the contents of files associated with the open handles if the open handle are file handles.

5. The method of claim 3, wherein building the handle list comprising information associated with open handles in the system includes obtaining information associated with the open handles using function calls to an application program interface of an operating system.

6. Logic encoded in non-transitory media such that when executed is operable to:

build a handle list comprising information associated with open handles in the system, wherein the information comprises handle names associated with the open handles in the system;

detect potential malicious code associated with malware by determining whether the handle names recorded in the handle list are capable of being created by code associated with malware;

obtaining information associated with the open handles directly from an operating system of the system, wherein obtaining the information comprises using function calls to an application program interface for the operating system of the system, wherein obtaining the information associated with the open handles directly from the operating system of the system further comprises:

sending, by a virus scanning engine, a function call to the application program interface for the operating system; and receiving, by the virus scanning engine and in response to the function call, information associated with open handles in the system directly from the operating system; and comparing information from the handle list and the obtained information directly from the operating system for deviations to detect malicious code potentially stealthed inclusion in the handle list or the obtained information.

7. The method of claim 3, further comprising analyzing system resources referenced by the open handles.

8. The method of claim 6, wherein building the handle list comprising information associated with open handles in the system obtains information associated with the open handles from a filter driver.

9. The logic of claim 6, wherein the logic is further operable to determine if the open handles are files handles and to scan the contents of files associated with the open handles if the open handles are file handles.

10. The logic of claim 6, wherein the logic in building the handle list comprising information associated with open handles in the system obtains information associated with the open handles from a filter driver.

11. A method of building a handle list of information associated with open handles in a system, the method comprising:

receiving, at a filter driver positioned between an operating system for the system and applications or files in the system, requests for resources from the applications or files;

relaying the requests to the operating system;

receiving, at the filter driver, responses to the requests, the responses including handles;

recording, by the filter driver, information associated with the handles in a handle list;

relaying, from the filter driver, the responses to the applications or files, the applications or files opening the handles;

receiving information associated with open handles in the system directly from the operating system, wherein receiving the information directly from the operating system comprises:

sending, by a virus scanning engine, a function call to the application program interface for the operating system of the system; and receiving, by the virus scanning engine and in response to the function call, information associated with open handles in the system directly from the operating system; and comparing the recorded information and the obtained information directly from the operating system for deviations to detect malicious code potentially stealthed from inclusion in the recorded information or the obtained information.

12. The method of claim 11, wherein receiving information associated with open handles in the system comprises:

sending a function call to an application program interface for the operating system; and receiving, in response to the function call, information associated with open handles in the system.

13. The method of claim 11, wherein the information associated with the open handles includes handle values, handle names, and an object addresses.

14. The method of claim 11, wherein the comparison of the recorded information from the filter driver and the obtained information directly from the operating system is performed by the virus scanning engine.

15. The method of claim 1, wherein the comparison of the recorded information from the filter driver and the obtained information directly from the operating system for is performed by the virus scanning engine.

16. The method of claim 3, wherein the comparison of the recorded information from the handle list and the obtained information directly from the operating system is performed by the virus scanning engine.

\* \* \* \* \*

UNITED STATES PATENT AND TRADEMARK OFFICE
CERTIFICATE OF CORRECTION

PATENT NO. : 8,453,242 B2
APPLICATION NO. : 11/202446
DATED : May 28, 2013
INVENTOR(S) : Chandnani Page 1 of 1

It is certified that error appears in the above-identified patent and that said Letters Patent is hereby corrected as shown below:

In the Claims

Column 7, line 12, claim 2, please change "handle are" to -- handles are --

Signed and Sealed this
Third Day of June, 2014

Michelle K. Lee
*Deputy Director of the United States Patent and Trademark Office*